United States Patent
Rajaraman et al.

(10) Patent No.: US 9,135,371 B2
(45) Date of Patent: Sep. 15, 2015

(54) CONTEXTUAL VIDEO BROWSING

(75) Inventors: Shivakumar Rajaraman, San Francisco, CA (US); John Skidgel, Oakland, CA (US); Vasilios Pantazopoulos, San Bruno, CA (US)

(73) Assignee: Google Inc., Mountain View, CA (US)

( * ) Notice: Subject to any disclaimer, the term of this patent is extended or adjusted under 35 U.S.C. 154(b) by 915 days.

(21) Appl. No.: 13/103,996

(22) Filed: May 9, 2011

(65) Prior Publication Data

US 2012/0290933 A1 Nov. 15, 2012

(51) Int. Cl.
*G06F 3/0482* (2013.01)
*G06F 17/30* (2006.01)

(52) U.S. Cl.
CPC ...... *G06F 17/30991* (2013.01); *G06F 17/3084* (2013.01); *G06F 17/30817* (2013.01); *G06F 17/30825* (2013.01); *G06F 17/30849* (2013.01)

(58) Field of Classification Search
CPC .................. G06F 17/30817; G06F 17/30247; G06F 17/30943; H04N 21/482; H04N 21/8549; H04N 5/44543
USPC ......................................................... 715/719
See application file for complete search history.

(56) References Cited

U.S. PATENT DOCUMENTS

| | | | |
|---|---|---|---|
| 8,117,564 B2 * | 2/2012 | Woods et al. ................. | 715/850 |
| 8,364,673 B2 * | 1/2013 | Chang et al. ................. | 707/728 |
| 2005/0193015 A1 * | 9/2005 | Logston et al. ............ | 707/104.1 |
| 2005/0257166 A1 * | 11/2005 | Tu ................................. | 715/787 |
| 2007/0174790 A1 | 7/2007 | Jing et al. | |
| 2007/0256012 A1 * | 11/2007 | Jang et al. ..................... | 715/700 |
| 2008/0074399 A1 | 3/2008 | Lee | |
| 2008/0216020 A1 | 9/2008 | Plummer | |
| 2009/0158323 A1 * | 6/2009 | Bober et al. ..................... | 725/37 |
| 2009/0199099 A1 * | 8/2009 | Girgensohn et al. .......... | 715/719 |
| 2010/0064254 A1 | 3/2010 | Atsmon et al. | |
| 2010/0223646 A1 | 9/2010 | Goldeen et al. | |

OTHER PUBLICATIONS

Kaleidescape Inc., "Using the Kaleidescape Movie Covers View," video uploaded on YouTube on Jun. 10, 2010, 2 Pages [online] [retrieved on Nov. 2, 2011] Can be retrieved from the internet <URL:http://www.youtube.com/watch?v=HnsCFd0YExY>, (Specifically at 0:29/0:47).

Kaleidescape Inc., "Using the Kaleidescape Movie List View," video uploaded on YouTube on Jun. 10, 2010, 2 Pages [online] [retrieved on Nov. 2, 2011] Can be retrieved from the internet <URL:http://www.youtube.com/watch?v=WlzmnlfZOAE>, (Specifically at 0:24/1:09).

Davidson, J., et al., "The YouTube Video Recommendation System" Proceedings of the Fourth ACM Conference on Recommender Systems, Sep. 30, 2010, pp. 293-296.

(Continued)

*Primary Examiner* — Namitha Pillai
(74) *Attorney, Agent, or Firm* — Fenwick & West LLP

(57) ABSTRACT

A method and system for contextual browsing of videos that are relevant to a current video. Browsing controls that include labels and previews are presented in a user interface. The labels represent sets of videos that are organized according to their relevancy to a current video. The previews represent videos from a set of videos that is currently in focus. If the user switches focus from one set of videos to another set of videos, the previews are updated to correspond to the videos in the second set of videos. The user can also browse through the previews in order to select another video for playback.

35 Claims, 7 Drawing Sheets

(56) References Cited

OTHER PUBLICATIONS

Hindle, A., et al., "Clustering Web video search results based on integration of multiple features," World Wide Web Internet and Web Information Systems, Aug. 3, 2010, pp. 53-43, vol. 14.

Novelty Search/Written Opinion, Netherlands Patent Application No. 2007887, Mar. 20, 2012, 9 pages (English translation of relevant portions included).

PCT International Search Report and Written Opinion, PCT/US2011/061128, Sep. 14, 2012, 9 Pages.

Office Action for Canadian Patent Application No. CA-2,833,340, Jun. 9, 2015, 3 pages.

Extended European Search Report for European Patent Application No. EP 11865107.4, Jul. 27, 2015, 10 pages.

\* cited by examiner

CONTEXTUAL VIDEO BROWSING

TECHNICAL FIELD

The present disclosure generally relates to video browsing, and specifically to browsing sets of videos that are contextually related to a current video.

BACKGROUND

For current video hosting websites, such as YOUTUBE, the user interface includes a video display window where a currently selected video is presented, along with various means by which one or more other videos may be selected for viewing. In interfaces that are designed for display on a computer screen, the user can select another video by selecting a hyperlink or a thumbnail image that is displayed in a sidebar or by entering a keyword search for a new video.

However, the arrangement, appearance, and behavior of these user interfaces are designed to be used by a user of a conventional computer having input devices such as a mouse, which allows the user to easily move a cursor to any point on the display device, and keyboard which allows for direct alphanumeric input. As such, these user interfaces become difficult to navigate when applied to televisions or other devices where the user input device provide very limited input controls. For instance, many televisions are controlled with a simple directional input device that has only up, down, left, and right buttons or keys, such as a directional pad ("D-pad") or the "arrow keys" on a keyboard Such devices do not provide for full, arbitrary placement control over a cursor, but instead only allow for limited vertical and horizontal movements.

The problem is compounded as the number of available videos increases. Many video hosting websites host millions of videos, thereby making it all the more important to provide a user interface by which the user can easily browse and search for content of interest. Additionally, many users can now very easily view video content from video hosting sites on televisions and other display systems operated by D-pad type controllers, rather than with a computer mouse and keyboard. Users continue to expect to have the ease of use they are familiar with from their computer experiences in the different system environment of a television or similar display device.

SUMMARY

The present disclosure relates to computer-implemented methods, systems and computer program products for contextual browsing of videos that are related to a currently playing video. In one embodiment, a current video is displayed to a user via a user interface. To assist the user in finding another video to watch, one or more sets of videos that are related to the current video are identified, and a set of controls are displayed for navigating through the sets of related videos. The controls include labels, where each label is associated with one of the sets of related videos. In one embodiment, the labels are arranged linearly in a first direction of the user interface (e.g. along a vertical axis) according to the relevancy between the sets of videos and the current video, such that labels for less relevant video sets are displayed at increasing distances from the label for the most relevant video set.

The linear arrangement of labels allows the user to switch a focus from one label to another label to navigate between different sets of videos, using just two directional controls (e.g., up/down) on a simple directional controller. As the user moves the focus to a label or between labels, previews for the set of videos represented by the focused label are displayed. These previews are preferably arranged linearly along a second direction of the user interface that is perpendicular to the first direction (e.g., along a horizontal axis). This allows the user to traverse through the previews again using just two directional controls (e.g., left/right). Using the displayed previews, the user can browse through the videos in the focused set of videos and select one of the videos for playback. Through the use of these unique browsing controls that present video sets based on their relevancy to the current video, the user can quickly identify another video of interest in a short amount of time.

The features and advantages described in this summary and the following detailed description are not all inclusive. Many additional features and advantages will be apparent to one of ordinary skill in the art in view of the drawings, specification and claims hereof.

BRIEF DESCRIPTION OF THE DRAWINGS

Figure (FIG. 1 is a block diagram of the system architecture in accordance with one embodiment.

The figures depict a preferred embodiment of the present disclosure for purposes of illustration only. One skilled in the art will readily recognize from the following discussion that alternative embodiments of the structures and methods illustrated herein may be employed without departing from the principles described herein.

DETAILED DESCRIPTION

Figure 1:
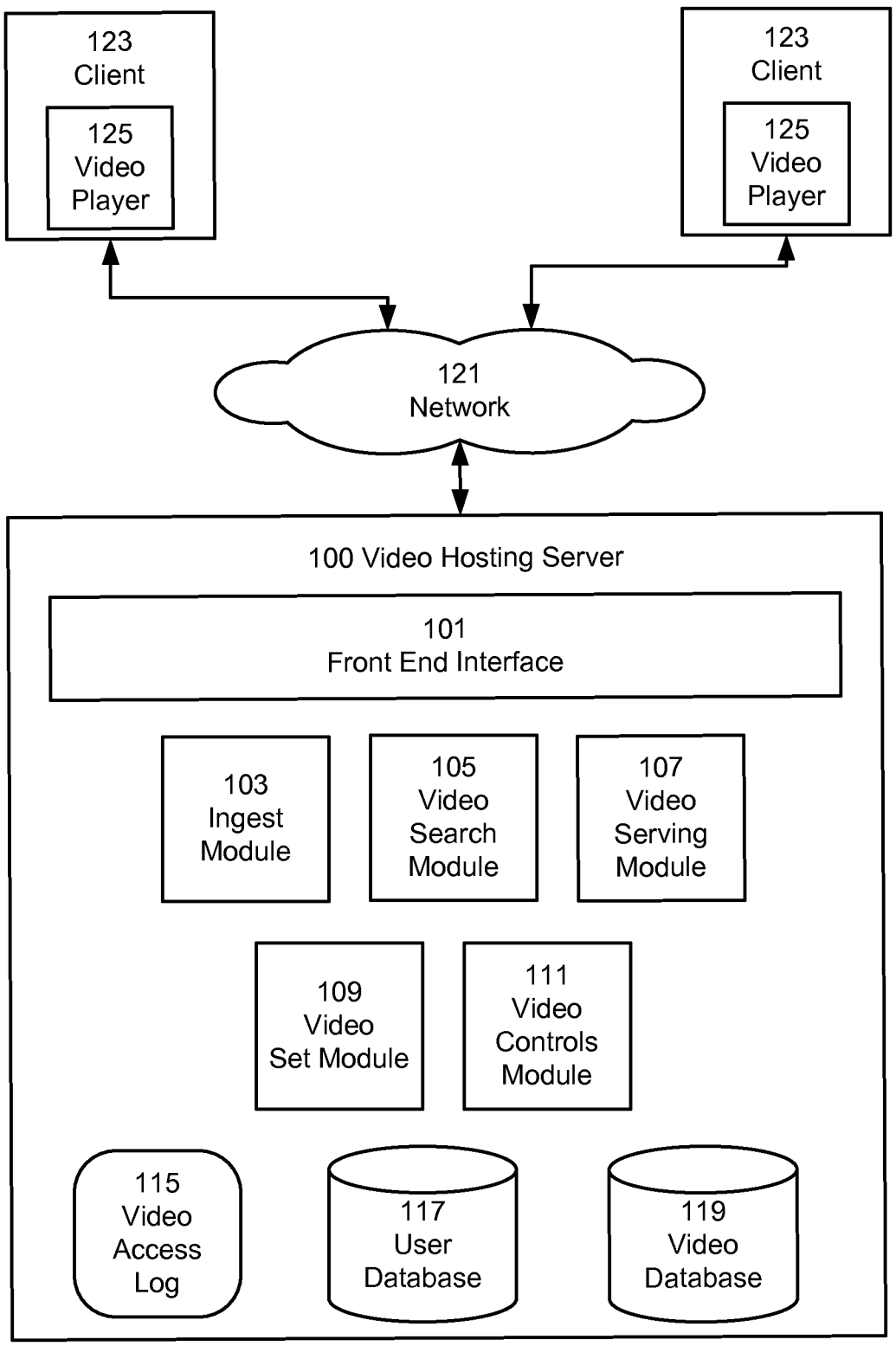

FIG. 1 describes a system architecture of a video hosting system in accordance with one embodiment. The system includes clients 123 that communicate with a video hosting server 100 via a network 121. Generally, the video hosting server 100 is responsible for hosting uploaded media items for display to users of the clients 123. In the context of the system, the video hosting server 100 is specifically responsible for generating and providing to a video player in a client device instructions and data from which the video player can display a user interface as described herein. Alternatively, in other embodiments, the video player in the client can be responsible for generating the user interface. It should be noted that videos are just one example of media items, and in other embodiments, the principles described herein are applicable to any type of media items (e.g., pictures, music, etc).

As shown in FIG. 1, the video hosting server 100 comprises a front end interface 101, an ingest module 103, a video search module 105, a video serving module 107, a video set module 109, a video controls module 111, a video access log 115, a user database 117, and a video database 119. Many conventional features, such as firewalls, load balancers, application servers, failover servers, site management tools and so forth are not shown so as not to obscure the features of the system.

The video hosting server 100 can be accessed through various means. A suitable website for implementation of the video hosting server 100 is the YOUTUBE™ website, found at www.youtube.com; other video hosting sites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server 100 side can also be performed on the client 123 side in other embodiments if appropriate. In addition, the functionality attributed to a particular component can be performed by different or multiple components operating together. The server 100 can also be accessed as a service provided to other systems or devices through appropriate application programming interfaces, and thus is not limited to use in websites only.

The video hosting server 100 is implemented as server program executing on server-class computer comprising a CPU, memory, network interface, peripheral interfaces, and other well known components. The computers themselves run an operating system such as LINUX, Microsoft Windows, or Mac OS X, have generally high performance CPUs, 2G or more of memory, and 1TB or more of disk storage. Of course, other types of computers can be used, and it is expected that as more powerful computers are developed in the future, they can be configured in accordance with the teachings here. The functionality implemented by any of the elements can be provided from computer program products (e.g., as computer executable instructions) that are stored in tangible computer-readable storage mediums (e.g., RAM, hard disk, or optical/magnetic media).

In one embodiment a client 123 executes a video player 125 and can connect to the video hosting server 100 to view media content, herein referred to as a "video," "video content" or "video items" via a network 121. Network 121 is typically the internet, but can also be any network, including but not limited to any combination of a LAN, a MAN, a WAN, a mobile, wired or wireless network, a private network, or a virtual private network. While only a two clients 123 and video players 125 are shown, it is understood that very large numbers (e.g., millions) of clients are supported and can be in communication with the video hosting server 100 at any time.

In one embodiment, the client 123 may include a variety of different computing devices, some examples of which are televisions, set top boxes, video game consoles, personal computers, digital assistants, personal digital assistants, cellular phones, mobile phones, smart phones, tablet computers and laptop computers. The client 123 may be adapted to work with various input devices, such examples of which are a mouse, keyboard, touch-screen, or remote control.

The video player 125 includes any application that is adapted for playing and browsing videos stored on the video hosting server 100. The player can be adapted to play videos in various formats, such as Adobe Flash™, WebM, H.264, DivX, FFMPEG, and the like. In one embodiment, the video player 125 may be a standalone program that is specifically dedicated for video playback (e.g., a dedicated program in a set top box). In other embodiments, the video player 125 is a plug-in or add on to a web browser that allows users of client 123 to access web pages on the World Wide Web. Suitable applications are Microsoft Internet Explorer, Netscape Navigator, Mozilla Firefox, Apple Safari or any application adapted to allow access to web pages on the World Wide Web.

The video player 125 allows the user of client 123 to search for and browse through videos hosted by the video hosting server 100 via a user interface provided by the front end interface 101, and loaded into the video player 125. By loading the user interface in the video player 125, a user can find and play a video. The user can then select the next video for playback by browsing through different sets of videos that are related to the current video. Alternatively, the user interface can be native to the video player 125, and then populated with its content in the manner as described below.

Users of the client devices 123 can also search for videos on the user interface based on keywords, tags or other metadata. In one embodiment, these requests are received as queries in the user interface provided by the front end interface 101 and are provided to the video search module 105, which searches the video database 119 for videos that satisfy the queries. The video search module 105 supports searching on any fielded data for video content, including its title, description, tags, author, category, comment, and so forth. The video serving module 107 retrieves videos selected by the video search module 105 from the video database 119, which is formatted into a file and transmitted to the client 123 for playback in the user interface.

In some embodiments, the video player 125 also allows users to upload videos to the video hosting server 100 via the user interface provided by the front end interface 101. In one embodiment, the uploaded videos provided by users are processed by an ingest module 103 at the video hosting server 100. The ingest module 103 processes the video for storage in the video database 119. The processing can include appropriate transformations for the video content. For example, video processing can include format conversion (transcoding), compression, metadata tagging, and other data processing. The uploaded videos can include, for example, video, audio or a combination of video and audio. The ingest module 103 processes the videos in order to standardize content for playback to users of client 123. Once uploaded videos have been formatted, the ingest module 109 stores the video into the database 119. An uploaded video is associated with the content publisher (i.e., the user that uploaded the video) and the content publisher's account record is updated in the user database 117 as needed.

The video database 119 is used to store videos. The video database 119 stores videos and associated metadata provided by their respective content owner who provided the videos. Each stored video is assigned a video identifier (ID) when it is processed by the ingest module 109. The videos have metadata associated with each video such as a video ID, artist, video title, label, genre, time length, and optionally geo-restrictions that can be used for data collection or content blocking on a geographic basis.

The user database 117 stores a record of all users viewing videos provided by the video hosting server 100. In one embodiment, the user database 117 stores a record of all users who have registered an account with the video hosting server 100. Each registered account includes at least a user name and e-mail address associated with the account. A registered account may also include information about the user associated with the account such as their name, hobbies, uploaded videos, favorite videos, and/or playlists of videos created by the users.

For each user, the video access log 115 tracks the user's interactions with videos, from which relationships between videos can be determined. Each entry in the video access log 160 identifies a video being accessed, a time of access, a user ID if available, data identifying the type of interaction with the video. Interaction types can include any user interaction, such as playing, saving, rating, sharing, pausing, rewinding, and forwarding a video. The video access log may also maintain information on videos users choose to watch as measured by click thru rates between videos and/or percentage of a video watched. For example, the click thru rate between a first and second video may be the rate at which users choose (e.g., via a user input selection, such as a click) to view the second video, when presented with the first video. For example, a click thru rate can be computed as the number of times users choose to view the second video divided by the number of times the users are presented with the option of playing the second video while the first video is being played. Alternatively, the click thru rate may be simply computed as the number of times a video is selected for display divided by the number of times the video is presented as available for displaying (e.g., a thumbnail or a link). This information as well as other types of information may be used to determine what videos are presented to a user.

The video set module 109 accesses the video access log 115, the user database 117 and/or video database 119 to identify sets of videos that are related to a video that is currently being played ("current video") in the user interface. A set of videos refers to any grouping of videos from the video database 119. For example, a set of videos may include:

(1) videos sharing common metadata (e.g., artist, genre, title, etc.);
(2) videos uploaded by the same user;
(3) videos in a user-created playlist;
(4) videos having some semantic or statistical relationship with respect to the current video, such as having a high click thru or co-occurrence rate (e.g., how often two videos are watched together within some set amount of time) with the current video.

The video set module 109 uses the information in the video access log 115 to determine the contextual relevance between the current video and various set of videos. For a given set of videos, contextual relevance is a measure of the likelihood (or alternatively probability) that a user watching the current video would next watch a video in the given set of videos.

In one embodiment, individual relevancy scores are computed for each video in a video set as a function of user viewing patterns. For example, relevancy for a given video can be computed as a function of click thru rates for the current video and a given video, co-occurrence rates for the current video and the given video, how long users watch the given video for after viewing the current video, etc. An overall relevancy score is then computed for a set of videos as a function of (e.g., an average) its individual relevancy scores. In other embodiments, other factors may be considered in determining the overall relevancy score for a set of videos, such as whether the current video is also in the set of videos or whether the current video shares similar metadata with the set of videos. Sets having an overall relevancy score that is higher than some threshold are determined to be related to the current video. Sets having higher overall relevancy scores are determined to be more relevant than sets having lower overall relevancy scores.

The video controls module 111 manages the generation and display of contextual browsing controls for browsing of videos sets identified by the set module 109 as being related to a current videos, and provides the relevant instructions and data to the video player for displaying the controls on the client device. The video controls module 111 receives from the client 123 user inputs with respect to the browsing controls, and updates the labels on the controls, and the video set that is presented in conjunction with the controls, and provides the updated information to front end interface 101 for presentation to the client 123.

The browsing controls allow a user to switch between sets of videos that are related to the current video and to browse within a set of videos in order to select a new video to watch. In one embodiment, the video sets are organized according to their relevancy to the current video. The video controls module 111 receives user inputs from the client 123 via the front end interface 101 for switching between sets of videos, browsing within a set of videos, or selecting a video for playback. The user inputs are generally originated from a directional controller type of device, such as a D-pad controller, arrow keys on a keyboard, or the like, which have the semantics of "up," "down," "left", "right", and "select," though of course they can be transmitted as coded input signals. In response, the video controls module 111 updates the labels of controls in the user interface and the video set that is presented in conjunction with the controls in accordance with the user input. In some embodiments, the functionality of the video controls module 111 may be implemented in the client 123 instead of the server 100.

The contextual controls allow for a simple and intuitive method of selecting an additional video to watch. Because video sets, as represented by the labeled controls, are presented in arrangement based on their relevancy to the current video, the user is more likely to find a video that he/she is interested in within a short amount of time. Also, because a user can interact with the controls with a simple set of inputs (e.g., up, down, left, right, select), the interface is particularly beneficial when used in conjunction with devices that have constrained inputs. The contextual controls are explained in greater detail in conjunction with FIGS. 2B, 2C, 2D, and 3.

Figure 2A:
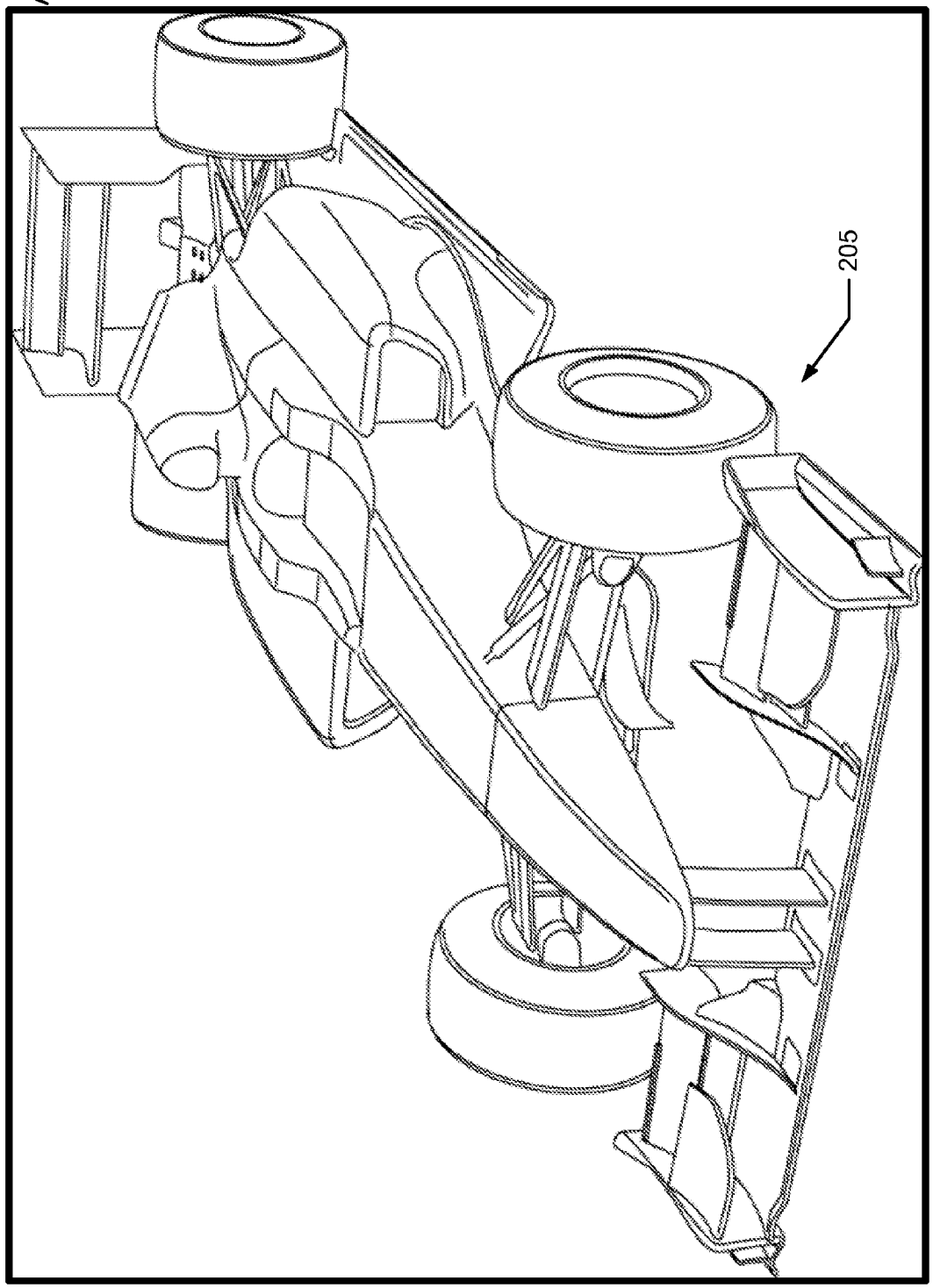
FIGS. 2A, 2B, 2C and 2D illustrate a user interface for contextual browsing of videos in accordance with one embodiment.

FIGS. 2A-2D illustrate a user interface 200 for contextual browsing of videos in accordance with an embodiment. In FIG. 2A, the user interface 200 includes a video 205 that has been selected by a user for playback, here for example a video of a car race. The video 205 may have been selected, for example, from a list of videos displayed to the user after entering a search query or from the browsing controls shown in FIG. 2B-2D. The video 205 occupies the entire interface 200 as it is being played. Alternatively, the video 205 may occupy only a portion of the interface 200 instead of the entire interface 200.

Figure 2B:
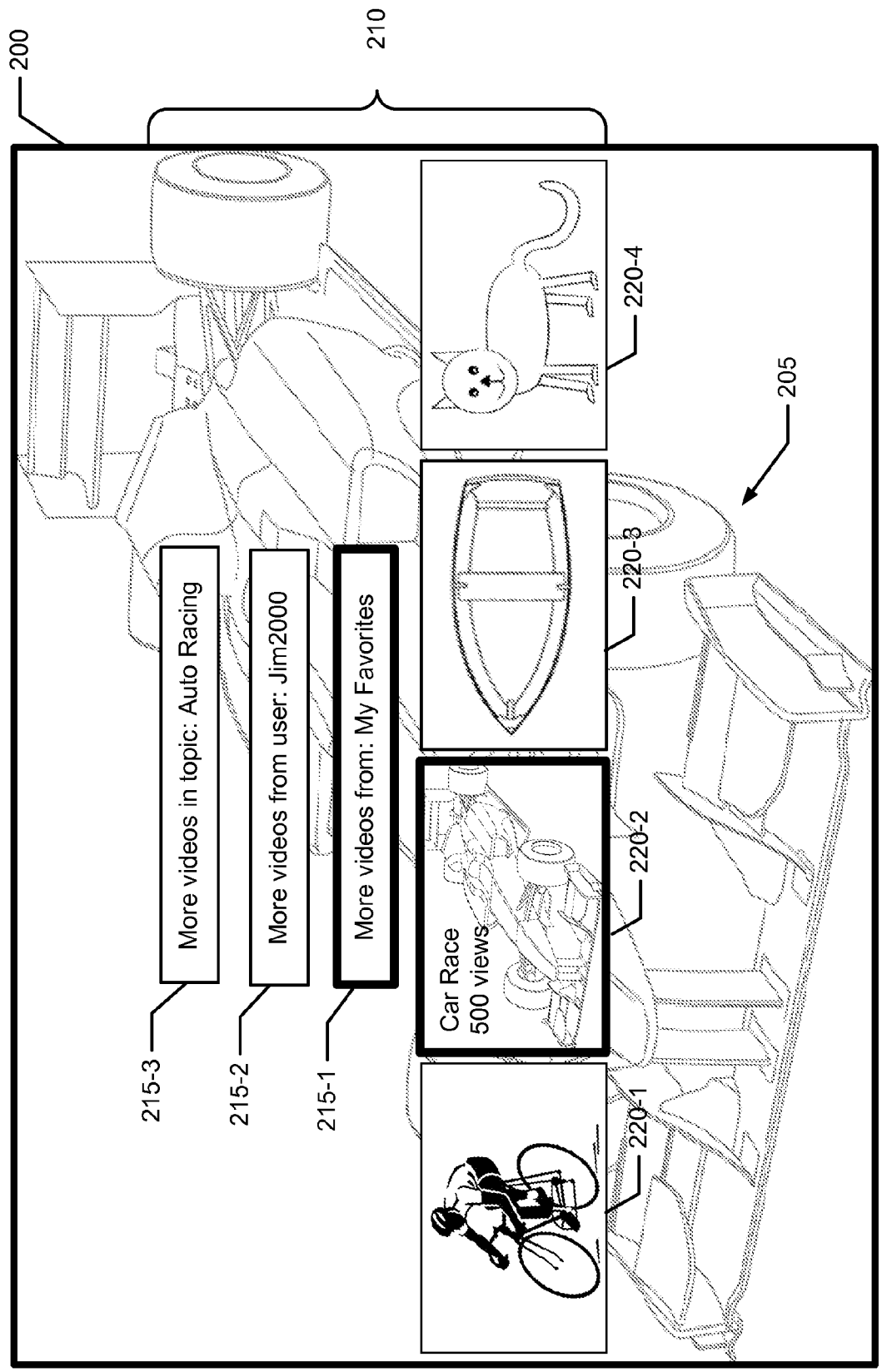

While watching the video 205 the user provides an input to activate the display of the controls, for example the "up" key. In FIG. 2B, contextual browsing controls 210 are overlaid onto the current video 205 in the user interface 200 in response to this input. Alternatively, the browsing controls may also be displayed when the video 205 finishes playing.

The browsing controls 210 include pivot controls 215 and set controls 220. The pivot controls 215 allow the user to switch focus between sets of videos, and the set controls 220 allow the user to switch focus between videos within the set of videos that is currently in focus. For example, the user may use the up or down buttons of a remote control to switch between sets of videos and the right or left buttons to switch between videos in a set. Once the user locates a video that he or she wants to watch, the user selects the video, for example with an enter button. The currently playing video 205 is then replaced with the selected video and the controls 210 are removed from the display.

The pivot controls 215 are comprised of individual labels (e.g., 215-1, 215-2, 215-3). Each label is a visual element that represents a set of videos. The labels 215 are displayed along a first axis (e.g., a vertical axis) in a linear arrangement. In some embodiments, a label includes text that summarizes or explains the nature of the video set represented by the label. For example, label 215-1 represents the set of videos from a user created playlist called "My Favorites." Label 215-2 represents the set of videos uploaded by user "Jim2000." Label 215-3 represents the set of videos in the topic of "Auto Racing." The label that has the focus is displayed in a visually distinctive manner (e.g., with highlighting, color, size, motion, outlining, etc). For example, label 215-1 has the focus and is shown with a larger and darker boarder. The user can move the focus between labels 215 using, for example, up and down inputs.

The set controls 220 are comprised of a plurality of preview cells (e.g., 220-1, 220-2, 220-3, 220-4) for the set of videos that is currently in focus, which can be referred to for convenience as the current playlist. For example, the label 215-1 for the playlist "My Favorites" is in focus, and so the set controls 220 include previews for videos in the playlist "My Favorites" to allow the user to browse among the videos in this playlist. The preview cells 220 are displayed in a linear arrangement along a second axis of the user interface 200 (e.g. a horizontal axis) that is perpendicular to the first axis.

Each preview cell is a visual element that represents a video. The preview cells can include, for example, still images or clips from the videos represented by the cell, and/or textual information about the videos (e.g., title, length, rating, total views, user comments, other metadata) to facilitate the user's decision of which video to watch. In one embodiment, the preview cell that is in focus can include textual information about its video, whereas the preview cells that are not in focus do not include the textual information. As shown, one of the previews cells 220-2 is displayed in a visually distinctive manner to indicate the cell 220 having the focus, and the user can move the focus between preview cells 220 using left and right inputs. In one embodiment, each time the set controls 220 are initially displayed, the preview cell 220 for the current video 205 is given the focus. Thus, in the FIG. 2B, preview cell 220-2, which represents the current video 250, is initially given the focus.

As previously discussed, the contextual relevance between the current video 205 and each set of videos is determined by the video set module 109, and represented by a relevancy score. The labels 215 for the sets of videos are organized in the interface 200 according to the relevance of the associated video sets to the current video 205, for example, in order from less relevant sets to more relevant sets. For example, the set of videos in the "My Favorite" playlist (label 215-1) is more relevant than the set of videos that are uploaded by user "Jim2000" (label 215-2), which in turn is more relevant than the videos in the topic of "Auto Racing" (label 215-3). Organizing the video sets according to their relevancy is beneficial for presenting the user with videos that he/she is likely to be interested in watching. In one embodiment, when the controls are first displayed, the set of videos with the highest relevancy (e.g., label 215-1) is located closest to the set controls 220, and less relevant sets of videos are located at increasing distances from the set controls 220. Focus is also placed on the set of videos that has the highest relevancy (e.g., label 215-1).

As shown, the contextual browsing controls 210 are overlaid onto the current video 205 while the current video 205 continues to play in the background. This allows the user to continue watching the current video 205 while browsing for a new video to watch. Alternatively, the current video 205 may be placed in a smaller window and displayed alongside the browsing controls 210, the current video 205 may be hidden from view, and/or the current video 205 may be paused while the browsing controls 210 are displayed.

Figure 2C:
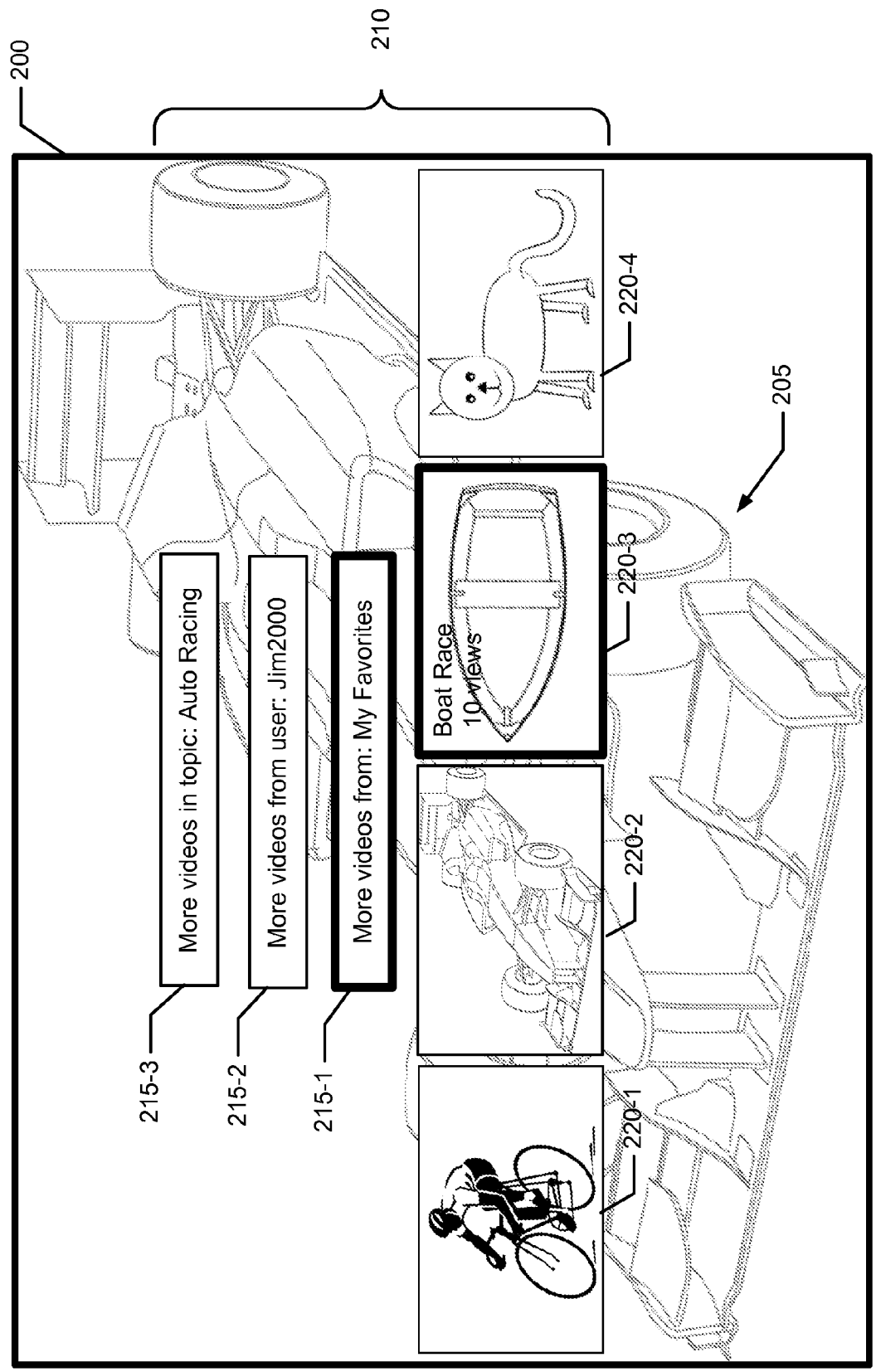

FIG. 2C illustrates how the set controls 220 can be used to browse through a set of videos according to an embodiment. In FIG. 2C, a user input has been received for shifting the focus from preview cell 220-2 to preview cell 220-3, for example a "right" input. In response, the focus is moved from the preview cell 220-2 to preview cell 220-3, which is displayed in a visually distinctive manner to show that focus has shifted. The current video 205 and the labels in the pivot controls 215 remain relatively unchanged as focus is shifted from one preview cell to the next, thereby maintaining the context of the video sets relative to the current video 205. Note that in FIGS. 2B and 2C, in the preview cell with the focus there is displayed additional contextual information, such as the title of the video and the number of times it has been viewed.

Figure 2D:
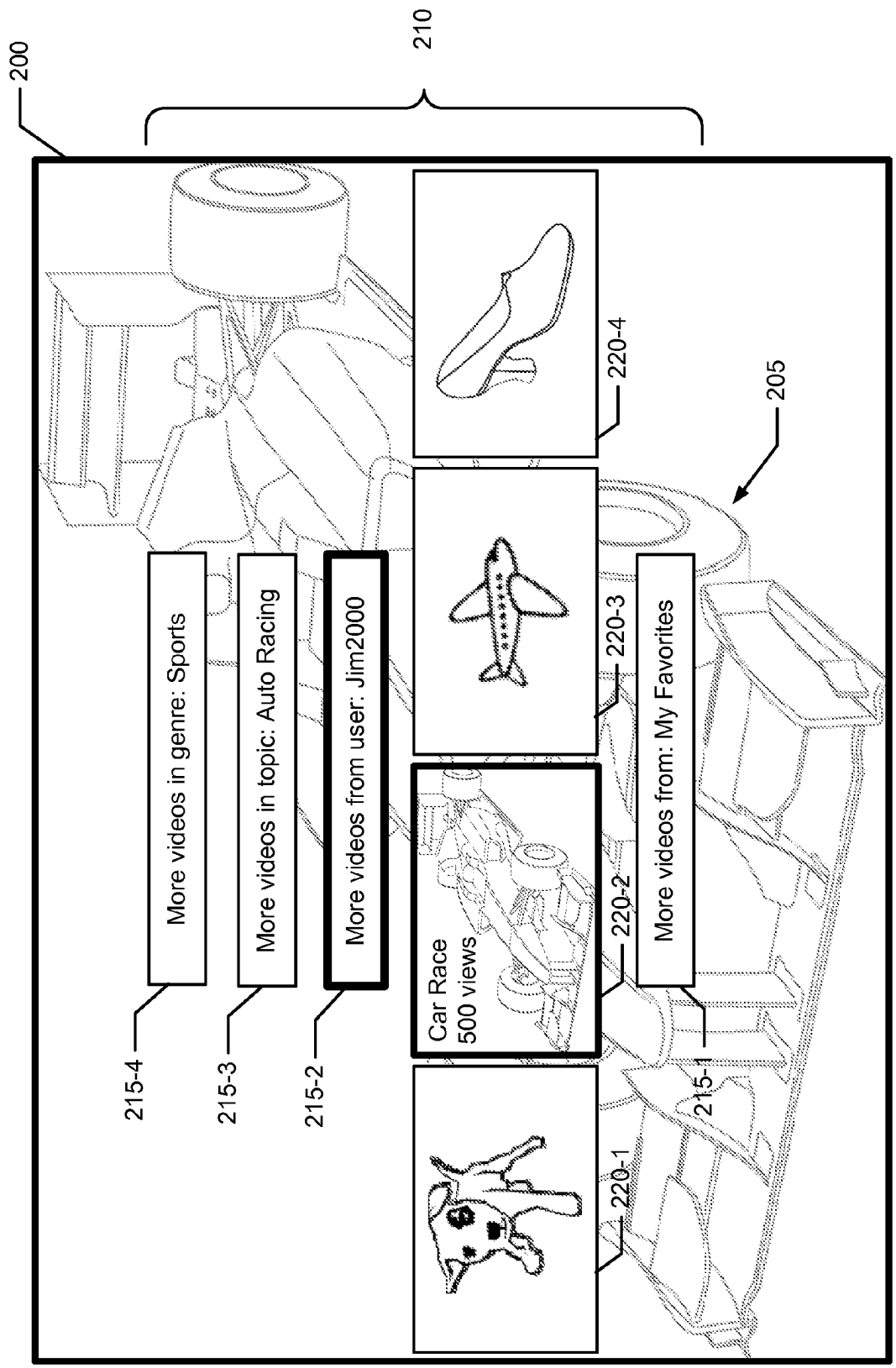

FIG. 2D illustrates how the pivot controls 215 can be used to switch between sets of videos. In FIG. 2D, a user input has been received for shifting the focus from label 215-1 to label 215-2, for example, and "up" input. In response, the focus is moved from the label 215-1 to label 215-2, which is displayed in a visually distinctive manner to show that focus has shifted In one embodiment, the pivot controls 215 scroll vertically across the user interface 200 as focus changes from one label to another. For example, now that label 215-2 is in focus, all the labels are shifted towards the bottom of the user interface 200. If label 215-3 were to be selected for focus, the labels would again scroll toward the bottom of the screen. A new label 215-4, which previously did not fit in the user interface 200, is now displayed in the user interface that represents a set of videos in the genre of "Sports." This shifting of labels can be repeated any number of times, and with each shift a new label 215 is displayed that corresponds to another set of videos. Thus, the user can continue to traverse "up" through any number of sets of videos. In some embodiments, the pivot controls 200 do not scroll, and are instead relatively stationary in the user interface 200 as the user switches from one set to another.

The set controls 220 are updated to correspond to the set of videos that is currently in focus. Thus, in FIG. 2D, the set controls 220 are updated to show previews for videos in the set of videos uploaded by user "Jim2000." Because the pivot controls 215 were scrolled downwards, label 215-1, which was previously in focus, is now located directly below and adjacent to the pivot controls 220. Label 215-2, which is now in focus, is located directly above and adjacent to the set controls 220. In other words, each time the user selects another label 215, the browsing controls 210 are updated so that the previews 220 are displayed between the label 215 with the focus and the previously focused label 215. As shown in FIG. 2D, the position of the set controls 220 is relatively stationary as the user switches focus from one label 215 to another. In some embodiments, the position of the set controls 220 may move up or down in the user interface to track the position of the label 215 with focus. Keeping the set controls 220 adjacent to the label in focus helps the user maintain a sense of the relationship between the label that is in focus and the previews shown in the set controls 220.

Figure 3:
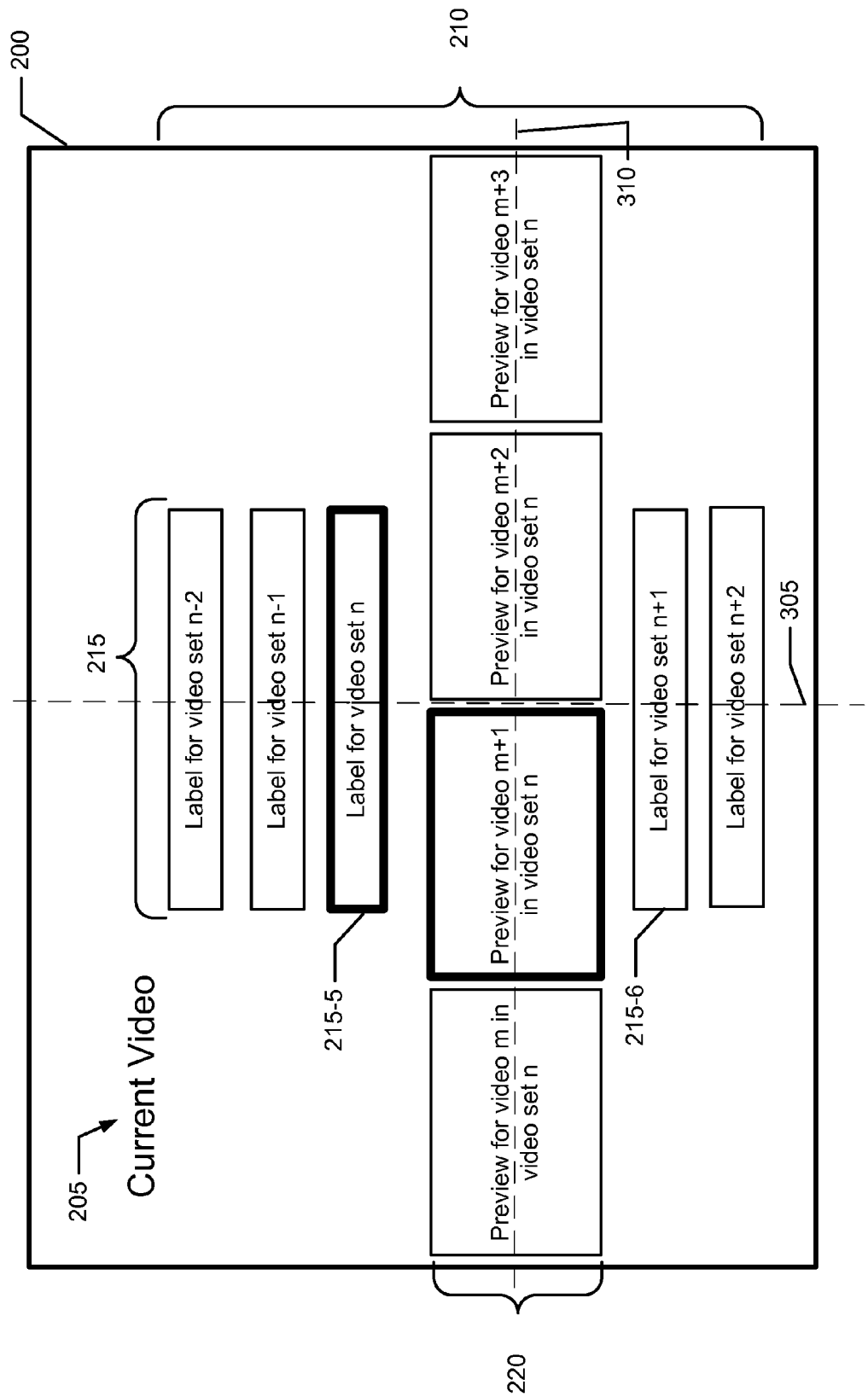
FIG. 3 illustrates a schematic view of a user interface for contextual browsing of videos in accordance with one embodiment.

FIG. 3 illustrates a schematic view of a user interface for contextual browsing of videos according to an embodiment. As shown, a current video 205 is playing in the background of the user interface 200. The pivot controls 215 include five labels that are distributed in a vertical direction of the user interface along the vertical axis 305. In other embodiments, a fewer or greater number of labels can be displayed. The labels are organized along the vertical axis 305 according to the relevancy between the current video 205 and the video sets represented by the labels. For example, more relevant video sets may be represented by labels placed at the bottom of the user interface 200, and less relevant video sets may be represented by labels placed at the top of the user interface 200.

Because the focus of the pivot controls 215 is on the label for video set n 215-5, the set controls 220 also correspond to videos from video set n. Previews of the videos in video set n are displayed in the set controls 220. The previews 220 are distributed in a horizontal direction of the user interface along a horizontal axis 310. The pivot controls 220 are located directly beneath the label 215-5 with focus. Generally speaking, the location of the pivot controls 220 is linked to the location of the label with focus, which in this example is label 215-5. The horizontal axis 310 and vertical axis 305 are perpendicular to each other. Note that the axes may or may not be located at the center of the user interface.

Figure 4:
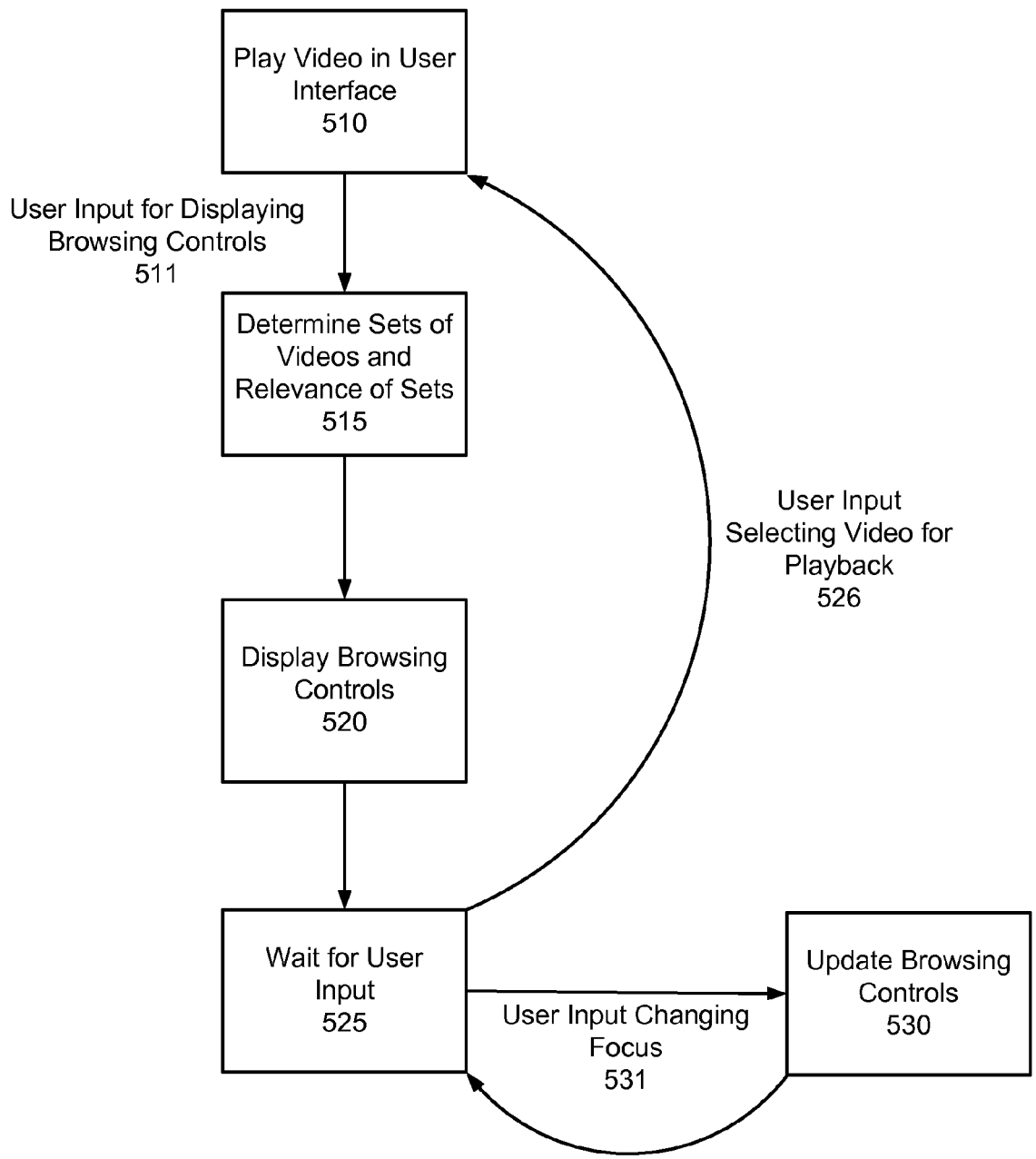
FIG. 4 illustrates a state diagram for contextual browsing of videos in accordance with one embodiment.

FIG. 4 is a state diagram for contextual browsing of videos according to an embodiment. Initially, a video is being played 510 to a user via a user interface. A user input for displaying browsing controls is received 511, wherein the user input is a directional input or a select/enter input. In response, the set module 109 identifies video sets that are related to the currently playing video and determines 515 the relevancy of these sets to the currently playing video. In some embodiment, the relevancy of the video sets may be determined in step 510 before any user input is received.

Once the relevancy of video sets is determined 515, contextual browsing controls are displayed 520 to the user via the user interface. The user interface may be similar to that shown in FIGS. 2B, 2C, 2D or FIG. 3. The contextual browsing controls allow a user to switch between sets of videos and to browse videos within each set of videos. The video sets are organized in the user interface according to their relevancy to expedite the process of finding a new video to watch.

The system then waits 525 for a user input. If a user input is received 531 for changing focus from one video set to another or for changing focus within a video set, the browsing controls are updated 530 in the user interface 525 in the manner described with respect to FIGS. 2A-2D, and the system waits 525 for another user input. If a user input is received 526 that selects a video for playback, the system hides the browsing controls and plays 510 the video in the user interface, and the process starts anew.

The apparatus described above for performing the described operations may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosed embodiments. This description should be read to include one or at least one and the singular also includes the plural unless it is obvious that it is meant otherwise. Similarly, the terms "first" and "second" are generally used herein to allow clear referencing of different elements of a same class (e.g., a "first label" as simply distinguished from "a second label"), rather than designating an ordering, ranking, or placement of the first item relative to the second item.

Upon reading this disclosure, those of skill in the art will appreciate still additional alternative structural and functional designs for a system and a process for browsing video sets through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method, executed by a server, for enabling browsing of videos via a user interface of a client device, the method comprising:
   providing for display, in the user interface, a plurality of video set labels distributed along a first direction of the user interface;
      wherein the plurality of video set labels correspond to a plurality of video sets that are related to a current video, each video set associated with a respective relevancy score indicative of a relationship between the video set and the current video and determined based on information describing how much of each video in the video set is watched after the current video is watched;
      wherein the video set labels are ordered along the first direction according to the respective relevancy scores of the video sets; and
      wherein focus among the plurality of video set labels is on a first video set label, the first video set label corresponding to a first video set; and providing for display, in the user interface, a plurality of video previews distributed along a second direction of the user interface that is perpendicular to the first direction,
    wherein the plurality of video previews correspond to videos from the first video set responsive to focus being on the first video set label, and
    wherein the plurality of video previews are displayed concurrently with the plurality of video set labels.

2. The method of claim 1, further comprising responsive to a user input for switching the focus among the video set labels from the first video set label to a second video set label corresponding to a second video set, updating the video previews to correspond to videos from the second video set instead of videos from the first video set.

3. The method of claim 2, wherein the first video set label is located on a first side of the video previews when focus is on the first video set label, and wherein the first video set label is located on a second side of the video previews when focus is on the second video set label.

4. The method of claim 2, wherein the video previews are located between the first video set label and the second video set label when focus is on the second video set label.

5. The method of claim 1, wherein focus among the plurality of previews is on a first preview corresponding to a first video from the first video set.

6. The method of claim 5, wherein the first preview comprises textual information associated with the first video from the first video set.

7. The method of claim 5, further comprising responsive to a user input selecting the first preview when the focus is on the first preview, playing the first video from the first video set in the user interface.

8. The method of claim 1, wherein a current video comprises a currently playing video.

9. The method of claim 1, wherein a video set label comprises a textual description of the video set that corresponds to the video set label.

10. The method of claim 1, wherein a preview comprises a still image from the video that corresponds to the preview.

11. The method of claim 1, wherein a respective relevancy score of a video set is further determined based on numbers of times each video in the video set is selected after the current video is watched.

12. A non-transitory computer-readable storage medium containing computer program code for controlling a processor to perform a method for enabling browsing of videos via a user interface, the method comprising:
    providing for display, in the user interface, a plurality of video set labels distributed along a first direction of the user interface;
        wherein the plurality of video set labels correspond to a plurality of video sets that are related to a current video, each video set associated with a respective relevancy score indicative of a relationship between the video set and the current video and determined based on information describing how much of each video in the video set is watched after the current video is watched,
        wherein the video set labels are ordered along the first direction according to the respective relevancy scores of the video sets,
        wherein focus among the plurality of video set labels is on a first video set label, the first video set label corresponding to a first video set; and
    providing for display, in the user interface, a plurality of video previews distributed along a second direction of the user interface that is perpendicular to the first direction,
        wherein the plurality of video previews correspond to videos from the first video set responsive to focus being on the first video set label, and
        wherein the plurality of video previews are displayed concurrently with the plurality of video set labels.

13. The non-transitory computer-readable storage medium of claim 12, wherein the method further comprises responsive to a user input for switching the focus among the video set labels from the first video set label to a second video set label corresponding to a second video set, updating the video previews to correspond to videos from the second video set instead of videos from the first video set.

14. The non-transitory computer-readable storage medium of claim 13, wherein the first video set label is located on a first side of the video previews when focus is on the first video set label, and wherein the first video set label is located on a second side of the video previews when focus is on the second video set label.

15. The non-transitory computer-readable storage medium of claim 13, wherein the video previews are located between the first video set label and the second label when the focus is on the second video set label.

16. The non-transitory computer-readable storage medium of claim 12, wherein focus among the plurality of previews is on a first preview corresponding to a first video from the first video set.

17. The non-transitory computer-readable storage medium of claim 16, wherein the first preview comprises textual information associated with the first video from the first video set.

18. The non-transitory computer-readable storage medium of claim 16, the method further comprising responsive to a user input selecting the first preview when the focus is on the first preview, playing the first video from the first video set in the user interface.

19. The non-transitory computer-readable storage medium of claim 12, wherein a current video comprises a currently playing video.

20. The non-transitory computer-readable storage medium of claim 12, wherein a video set label comprises a textual description of the video set that corresponds to the video set label.

21. The non-transitory computer-readable storage medium of claim 12, wherein a preview comprises a still image from the video that corresponds to the preview.

22. The non-transitory computer-readable storage medium of claim 12, wherein a respective relevancy score of a video set is further determined based on numbers of times each video in the video set is watched after the current video is watched.

23. A system for browsing of videos via a user interface, the system comprising:
    a computer processor; and
    a computer-readable storage medium storing instructions for controlling the processor to perform a method comprising:
        displaying, in the user interface, a plurality of video set labels distributed along a first direction of the user interface;
            wherein the plurality of video set labels correspond to a plurality of video sets that are related to a current video, each video set associated with a respective relevancy score indicative of a relationship between the video set and the current video and determined based on information describing how much of each video in the video set is watched after the current video is watched, wherein the video set labels are ordered along the first direction according to the respective relevancy scores of the video sets, wherein focus among the plurality of video set labels is on a first video set label, the first video set label corresponding to a first video set; and displaying, in the user interface, a plurality of video previews distributed along a second direction of the user interface that is perpendicular to the first direction, wherein the plurality of video previews correspond to videos from the first video set responsive to focus being on the first video set label, and wherein the plurality of video previews are displayed concurrently with the plurality of video set labels.

24. The system of claim 23, wherein the method further comprises responsive to a user input for switching the focus among the video set labels from the first video set label to a second video set label corresponding to a second video set, updating the video previews to correspond to videos from the second video set instead of videos from the first video set.

25. The system of claim 24, wherein the first video set label is located on a first side of the video previews when focus is on the first video set label, and wherein the first video set label is located on a second side of the video previews when focus is on the second video set label.

26. The system of claim 24, wherein the video previews are located between the first video set label and the second video set label when focus is on the second video set label.

27. The system of claim 23, wherein focus among the plurality of previews is on a first preview corresponding to a first video from the first video set.

28. The system of claim 27, wherein the first preview comprises textual information associated with the first video from the first video set.

29. The system of claim 27, wherein the method further comprises responsive to a user input selecting the first preview when the focus is on the first preview, playing the first video from the first video set in the user interface.

30. The system of claim 23, wherein a current video comprises a currently playing video.

31. The system of claim 23, wherein a video set label comprises a textual description of the video set that corresponds to the video set label.

32. The system of claim 23, wherein a preview comprises a still image from the video that corresponds to the preview.

33. The system of claim 23, wherein a respective relevancy score of a video set is further determined based on numbers of times each video in the video set is selected after the current video is watched.

34. A non-transitory computer-readable storage medium containing computer program code for controlling a processor to produce a user interface for browsing videos, the user interface comprising:

a plurality of labels distributed along a first direction of the user interface;

wherein the plurality of video set labels correspond to a plurality of video sets that are related to a current video, each video set associated with a respective relevancy score indicative of a relationship between the video set and the current video and determined based on information describing how much of each video in the video set is watched after the current video is watched, wherein the video set labels are ordered along the first direction according to the respective relevancy scores of the video sets, wherein focus among the plurality of video set labels is on a first video set label, the first video set label corresponding to a first video set; and a plurality of video previews distributed along a second direction of the user interface that is perpendicular to the first direction, wherein the previews correspond to videos from the first video set responsive to focus being on the first video set label.

35. A computer implemented method, executed by a client device, for enabling browsing of videos via a user interface in the client device, the method comprising:

displaying in the user interface, a plurality of labels distributed along a first direction of the user interface;

wherein the plurality of video set labels correspond to a plurality of video sets that are related to a current video, each video set associated with a respective relevancy score indicative of a relationship between the video set and the current video and determined based on information describing how much of each video in the video set is watched after the current video is watched;

wherein the video set labels are ordered along the first direction according to the respective relevancy scores of the video sets; and wherein focus among the plurality of video set labels is on a first video set label, the first video set label corresponding to a first video set; and displaying, in the user interface, a plurality of video previews distributed along a second direction of the user interface that is perpendicular to the first direction, wherein the plurality of video previews correspond to videos from the first video set responsive to focus being on the first video set label, and wherein the plurality of video previews are displayed concurrently with the plurality of video set labels.

* * * * *